United States Patent [19]

Delamare

[11] Patent Number: 4,895,394
[45] Date of Patent: Jan. 23, 1990

[54] METHOD AND SYSTEM MAINTAINING TIGHTNESS BETWEEN PARTS ROTATING IN RELATION TO ONE ANOTHER

[75] Inventor: Guy R. Delamare, Herblay, France

[73] Assignee: Technip-Geoproduction, Cedex, France

[21] Appl. No.: 130,479

[22] Filed: Dec. 9, 1987

Related U.S. Application Data

[63] Continuation of Ser. No. 758,338, Jul. 24, 1985, abandoned.

[30] Foreign Application Priority Data

Jul. 24, 1984 [FR] France .................................. 84 11838

[51] Int. Cl.4 .............................................. F16L 17/02
[52] U.S. Cl. ........................................ 285/18; 285/97; 285/98; 285/281; 285/351; 277/34; 277/27; 277/28; 277/227
[58] Field of Search .................... 285/97, 96, 98, 18, 285/351, 281; 277/34, 27, 28, 227

[56] References Cited

U.S. PATENT DOCUMENTS

| | | | |
|---|---|---|---|
| 2,016,154 | 10/1935 | McWhirter | 464/96 |
| 2,310,309 | 2/1943 | Orr | 277/34 X |
| 2,444,868 | 7/1948 | Allen et al. | 285/96 X |
| 2,553,750 | 5/1951 | Cole | 277/123 |
| 2,597,514 | 5/1952 | Nash | 464/23 |
| 2,648,554 | 8/1953 | Gilbert, Sr. | 277/34 |
| 2,676,823 | 4/1954 | Olson et al. | 277/227 X |
| 2,835,329 | 5/1958 | True | 277/227 X |
| 3,023,995 | 3/1962 | Hopkins | 285/97 X |
| 3,080,732 | 3/1963 | Crankshaw | 464/96 X |
| 3,207,221 | 9/1965 | Cochran et al. | 277/28 X |
| 3,471,156 | 10/1969 | Burns et al. | 277/3 |
| 3,608,912 | 9/1971 | Templin et al. | 277/123 |
| 3,679,217 | 7/1972 | Lesiechi | 277/28 X |
| 3,737,179 | 6/1973 | White, Jr. | 285/96 |
| 3,834,181 | 9/1974 | Strasburg et al. | 464/96 |
| 3,874,706 | 4/1975 | Arnold | 285/105 X |
| 3,947,009 | 3/1976 | Nelmark | 464/20 X |
| 3,995,448 | 12/1976 | Wright | 464/96 |
| 4,236,737 | 12/1980 | Herbert et al. | 464/20 X |
| 4,255,946 | 3/1981 | Hansen | 464/23 X |
| 4,276,758 | 7/1981 | Coman et al. | 464/23 |
| 4,323,280 | 4/1982 | Lansberry et al. | 285/97 X |
| 4,438,957 | 3/1984 | Williams et al. | 285/281 X |

FOREIGN PATENT DOCUMENTS

| | | | |
|---|---|---|---|
| 200073 | 10/1958 | Austria | 464/23 |
| 1045188 | 11/1958 | Fed. Rep. of Germany | 464/23 |
| 2124720 | 2/1984 | United Kingdom | 277/27 |

Primary Examiner—Thomas F. Callaghan
Attorney, Agent, or Firm—Antonelli, Terry & Wands

[57] ABSTRACT

A system for maintaining a tightness between two parts rotatable relative to each other. The system includes at least two sealing units, with each of the sealing units having at least two possible states or conditions, namely, a first state or condition for ensuring a tightness between the two parts and a second state or condition wherein it does not ensure a tightness. Each sealing unit is deformable and includes a drive arrangement for intermittently actuating each of the sealing units.

11 Claims, 7 Drawing Sheets

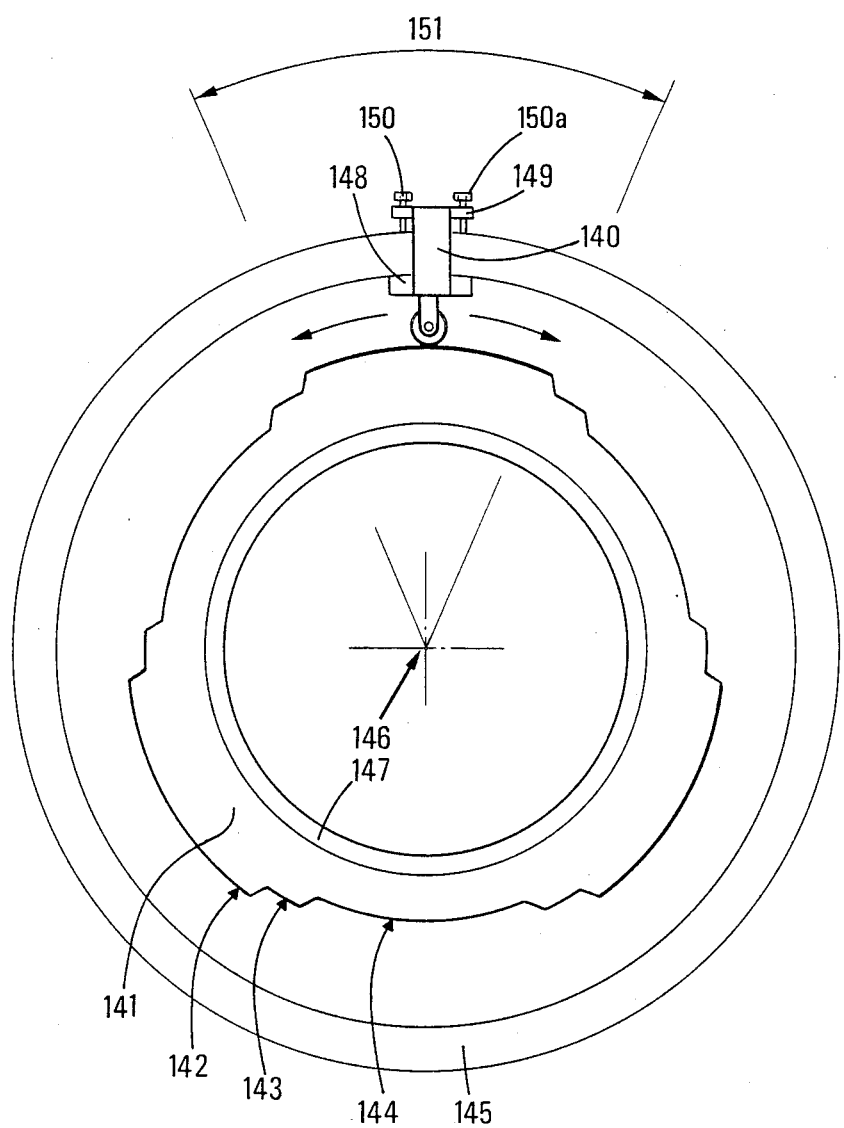

METHOD AND SYSTEM MAINTAINING TIGHTNESS BETWEEN PARTS ROTATING IN RELATION TO ONE ANOTHER

This is a continuation of application Ser. No. 758,338, filed July 24, 1985.

BACKGROUND OF THE INVENTION

The present invention relates to a method and a system for maintaining tightness between two coaxial pipes transferring fluid under very high pressure and rotatable relative to each other around a common axis so as to enable, for example, a transfer of fluid under pressure between two parts of a machine which rotate relative to each other.

The method and system of the invention is particularly suitable for this function when the rotation between two parts of the machine is slow and alternating and has a small amplitude, with the fluid pressure being very high and the required service life being very long.

So-called swivel joints maintaining tightness between two coaxial pipes rotating alternately to each other are well known, with the swivel joints using a elastic material packings associated with cylindrical or flat and annular bearing surfaces against which they are applied, especially by the fluid pressure. Rotation of one of the two co-axial pipes relative to each other can only be obtained by the sliding of the packing and its bearing surface.

When the pressure of the fluid to be transferred is very high, the elastic material packings are strongly pressed against their bearing surface and sliding causes rapid wear of the elastic material packings. Additionally, when the fluid pressure is very high, the sealing lips of the elastic material are subjected to a severe shearing stress.

Currently, materials for the manufacturing of packings which have the necessary flexibility for perfect mating with cooperating bearing surfaces generally do not have a sufficient shear strength and the lips of the packing may be destroyed by tearing, especially upon reversing a direction of rotation of the system.

Therefore, the present invention proposes a system wherein the contacting components are not driven with any relative rotational motion and, without damage, may be pressed against each other as strongly as necessary, to form an efficient barrier regardless the pressure of the fluid.

Systems of the aforementioned type are disclosed in, for example, U.S. Pat. Nos. 3,944,263, 2,253,932 and 3,689,082 along with French patents A-2,227,784, A-1,572,520, A-1,585,213, and A-1,310,665, with these patents relating to static or non-rotating joints and swivel joints.

The aim underlying the present invention essentially resides in providing a system for maintaining tightness between co-axial pipes rotating relative to each other and which is capable of confining a fluid under very high pressure, with the system being sturdy and wear resistant so as to enable a long service life.

Advantageously, the present invention may be used as a substitute for the prior art swivel joints used on fluid transfer systems such as, for example, transfer systems between marine structures and a ship such as, for example, an oil tanker, especially when the two structures are connected by an arm and are free to rotate relative to each other.

According to advantageous features of the present invention, a system is proposed for maintaining tightness between two parts rotatable relative to each other, wherein at least two sealing units are provided, with each of these sealing units having at least two possible states, namely, one state ensuring tightness between the parts and the second state not ensuring tightness. Each of these sealing units is deformable and the drive means may be provided for intermittently actuating each of the sealing units.

In accordance with the present invention, at least one of the sealing units, not always the same sealing unit is permanently in the first state and sealing may be accomplished by rotating the pipes relatively to each other around a common axis.

At least one of the sealing units may comprise a sleeve adapted to be subjected to elastic torsional deformation along an axis thereof, tightly connected at one end to one of the pipes and including at the other end thereof a flange provided with temporary connection means to the other pipe.

According to the invention, the sleeve may comprise at least one rigid ferrule connected, over a portion of the length thereof, to one of the two pipes through a first ferrule made of elastically deformable material, with one of the two cylindrical lateral faces adhering to the pipe and the other to the rigid ferrule, and, over another portion of a length of the sleeve, to the flange provided with the temporary connection means through a second elastically deformable ferrule, with one of the two cylindrical lateral faces adhering to the flange and the other to the rigid ferrule.

It is possible in accordance with the present invention for the sleeve to include a stack of flat elastically deformable rings, with a flat ring located at one of the ends of the sleeve adhering to a flange integral with one of the two pressure fluid transfer pipes, and a flat ring located at the other end of the sleeve adhering to the flange provided with the temporary connection means and the other pressure fluid transfer pipe.

In accordance with further features of the present invention, the sleeve may be a flexible elastically deformable tube and, if necessary reinforced by a tensile resistant wire armor, with one of the ends of the tube including a flange integral with one of the two pressure fluid transfer pipes, and the other end of the tube including another flange provided with temporary connection means to the other pressure fluid transfer pipe.

According to the invention, the temporary connection means may comprise an elastically deformable ring placed around the pipe to be connected, with the ring being disposed in a groove provided in the end of the flange of the sleeve and one of the lateral walls of which is movable and actuated by an annular hydraulic jack.

The shape of the ring is changed from an initial shape when temporarily subjected to compression stress along its axis by the annular hydraulic jack, and transmits the compression stresses radially around the pipe to simultaneously insure tightness between the sleeve and the pipe and to provide a rotational driving of the end flange of the sleeve by the fluid transfer pipe.

In accordance with still further features of the invention, the temporary connection means may comprise a tight and elastic membrane integral with the end flange of the sleeve adapted to be subjected to elastic torsional deformation, with which it defines a variable geometry annular chamber concentric with the pressure fluid transfer pipe, the membrane being able to take, depending on whether the chamber which it defines is fed with pressure fluid or not, a first position where, inflated, it is strongly applied against the pipe and ensures tightness between the sleeve and the pipe and provides a rotational driving, by friction of the end flange of the sleeve by the aforementioned pipe and a second position where, deflated, it is returned by its own elastic stiffness against the flange in its initial shape at rest, and is no longer in contact with the aforementioned pipe.

Advantageously, this tight and elastic membrane may be an elastomeric tube fixed at both ends unto the end flange of the sleeve liable to elastic deformation, with which it defines a pressurizable annular chamber and whose compressive strength and elastic deformability are ensured by an internal armor made of braided wires, the wires forming between themselves a suitable angle, close to 20°, so that under the pressurization action of the chamber, the diameter of the tube may be increased by modification of the angle formed between themselves by the braided wires, and return to its initial size when the pressure fluid feed is stopped, by elastic return of the elastomer between the braided wires.

Additionally, according to further features of the invention, the temporary connection means may comprise a collar integral with the fluid transfer pipe to be connected and fixed in a groove provided in the end flange of the sleeve adapted to be subjected to elastic torsional deformation, with the side walls of the groove being composed of the body and the ram of an annular hydraulic jack. In this case, and with the forced fed fluid of the cylinder of the hydraulic jack causes the side walls to be brought closer to one another and to strongly nip the collar so as the ensure, tightness between the sleeve and the collar and the rotation by friction of the end flange of the sleeve through the aforementioned pipe.

Advantageously, the annular hydraulic jack which actuates the mobile side wall of the groove provided in the end flange of the elastic sleeve comprises a jack body and a ram which are co-axial and are interconnected on either side of the pressurizable annular chamber which they confine, by two ferrules of elastically deformable material. The side faces of the ferrules adhere to the jack body and the ram, so that the axial motion of the ram in one direction, under the effect of the pressure of the fluid contained in the annular chamber is tolerated by the shear deformation of the flexible material of the ferrules and the motion in the opposite direction can be obtained, when pressure rise in the annular chambers is interrupted, by the elastic stiffness of the flexible material of the ferrules which tends to recover to its initial shape.

According to the invention, the drive which intermittently actuates each of the two units providing tightness between the two pipes may be connected to the rotation of these two pipes in relation to each other through a cam integral with one of the two aforementioned pipes and in a position detector connected through the cam and fixed to the other pipe, the detector starting the operation of the connection means fitted on the sealing units.

Advantageously, the position detector may be a three position fluid slide valve to which the four pipes are connected and the cam with which is associated a slide operation feeler may have a three level contour. Two of the pipes connect each of the valves to each of the temporary connection means provided on the intermittently actuated sealing units. The third pipe connects the valve to a pressure fluid generator associated with a pressure accumulator, and the fourth pipe connects the valve to an atmospheric receiver tank out of which the aforementioned generator draws the fluid which it pressurizes. The three positions of the valve then correspond to the tripping sequences of the sealing units during which, successively, only one of the two aforementioned units is in operation, then both of them, then only the second etc., each of these sequences corresponding to one of the three levels of the cam.

As an alternative, with a view towards supplying the temporary connection means with pressure fluid, a pipe may connect the slide valve to the system comprising the two-coaxial fluid transfer pipes rotating in relation to each other so that the energy of the fluid to be confined can be used directly to operate the connection means.

To this end, a pressure booster comprising a staggered piston sliding in the tight body with two-coaxial bores mays be provided on the pressure fluid supply system of the temporary connection means.

The above and other objects, features, and advantages of the present invention will become more apparent when taken into connection with the accompanying drawings which show, for the purpose of illustration only, several embodiments in accordance with the present invention.

BRIEF DESCRIPTION OF THE DRAWINGS

FIG. 8 is a plan view illustrating a mode of setting of the slide valve position with respect to the cam.

DETAILED DESCRIPTION

Figure 1:
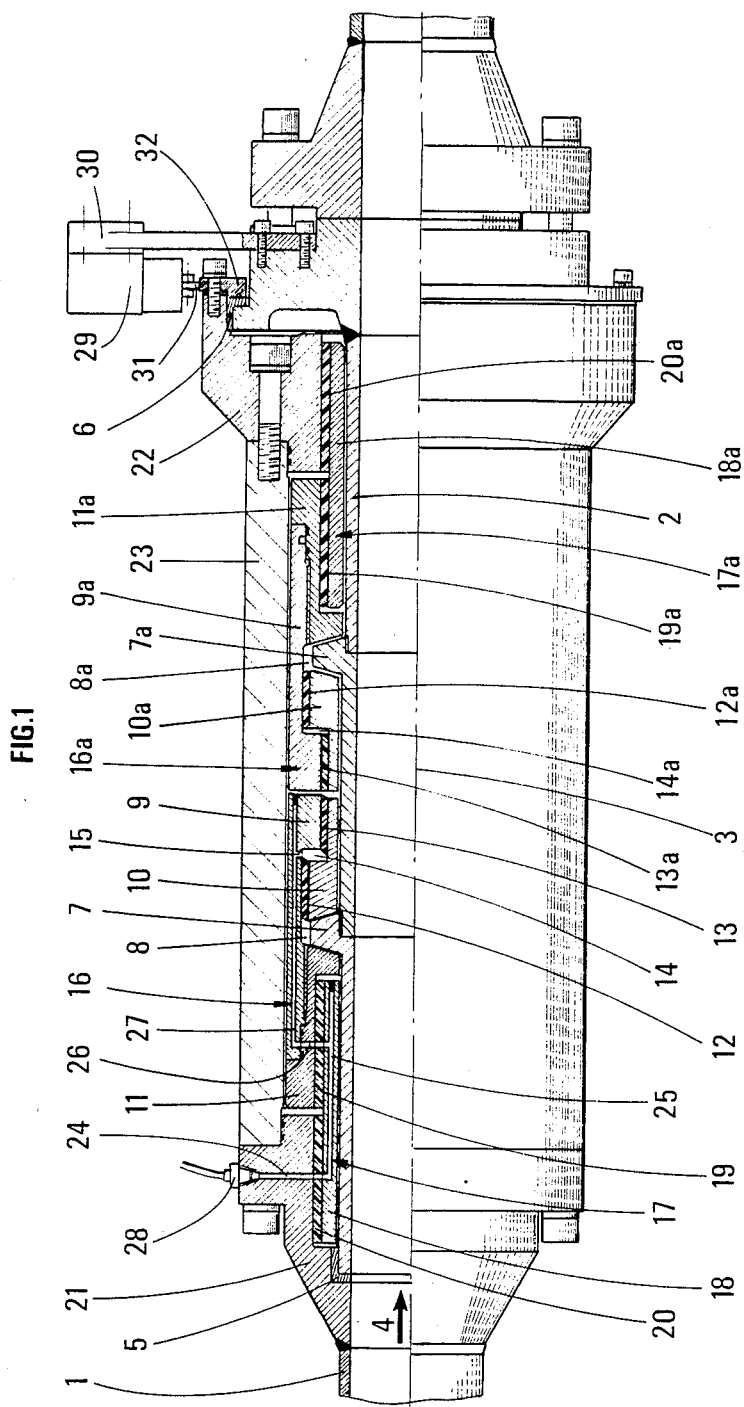
FIG. 1 is a longitudinal sectional view of a sealing system, according to the invention, wherein a sleeve adapted to be subjected to elastic torsional deformation includes flexible ferrules, and wherein the temporary connection means includes a collar integral with the pipe to be connected.

Referring now to the drawings wherein like reference numerals are used throughout the various views to designate like parts, and more particularly, to FIG. 1, according to this figure, a device for maintaining tightness between two coaxial pressure fluid transfer pipes 1, 2 rotating relative to each other about a common axis is provided with a pressure fluid accommodated by the coaxial pipes 1, 2 flowing from one pipe to the other in, for example, the direction of the arrow 4.

The two pipes 1, 2 are rotatably guided by bearings 5, 6 with the pipe 2 including two collars 7, 7a which are retained in two grooves 8 and 8a, with the first groove 8 resulting from the assembly of the body of a hydraulic jack 9 with the ram 10 and the flange 11, and the second groove 8a resulting from the assembly of a jack 9a, preferably identical with the hydraulic jack 9, and with the ram 10a and the flange 11a, preferably identical with the ram 10 and flange 11, respectively. Each of the rams 10 (or 10a) is connected to the body of the hydraulic jack 9 (or 9a), through the ferrules 12 and 13 (or 12a and 13a) made of elastically deformable material, to define and annular chamber 14 (or 14a) described more fully hereinbelow, connected, through a port such as a part 15, to a hydraulic system supplied with pressure fluid.

The body of the hydraulic jack 9a and the ram 10a are shown in their initial relative position when the annular chamber 14a is not supplied with pressure fluid. In this position, the collar 7a of the pipe 2 has no contact with the sides of the groove 8a, formed by the flange 11a and the ram 10a, and pipe 2 can rotate freely relative to pipe 1. On the other hand, the body of jack 9 and ram 10 are shown in a position where, a pressure fluid admitted to the annular chamber 14, exercises an internal thrust. This thrust separates the ram 10 from the body of the jack 9 according to translatory movement in the direction of the longitudinal axis which causes groove 7 to shrink. The collar 8 is then strongly pressed between the flange 11 and the ram 10.

Each of the temporary connection means 16 and 16a including the jack 9 (or 9a), the ram 10 (or 10a), the two elastic ferrules 12, 13 (or 12a and 13a) and the flanges 11 and 11a, are connected to pipe 1 through a sleeve 17 (or 17a) adapted to be subjected to elastic torsional deformation around the axis 3. This sleeve comprises a rigid ferrule 18 (or 18a), adhering over a portion of its length with a ferrule 19 (or 19a) made of elastically deformable material and adhering over the other portion of its length with another ferrule 20 (or 20a) made of elastically deformable material.

Ferrules 19 and 19a also adhere with flanges 11 and 11a respectively, whereas, the ferrule 20 also adheres to the flange 21 in prolongation of the pipe 1, and the ferrule 20a, also adheres to the flange 22 in prolongation of the pipe 2 through the cylindrical casing 23. A series of passages 24, 25, 26 and 27 is provided through flange 21, ferrules 18-20 19, flange 11; body 9, elastic sleeve 17, and connecting device 16, so that the opening of the parts 15 into the annular chamber 14 is in communication with pipe 28 which is connected to the pressure fluid supply system described hereinafter.

Another series of pipes (not shown) also connects, through the elastic sleeve 17a and the temporary connection means 16a, the annular chamber 14 to the pressure fluid supply system described hereinafter.

The system further includes a hydraulic slide valve 29, rotatable with the pipe 2, through support 30, having a slide actuated by roller 31 which follows a contour of cam 32 rotatable with the pipe 1 through flanges 22 and 21 and casing 23.

Figure 2:
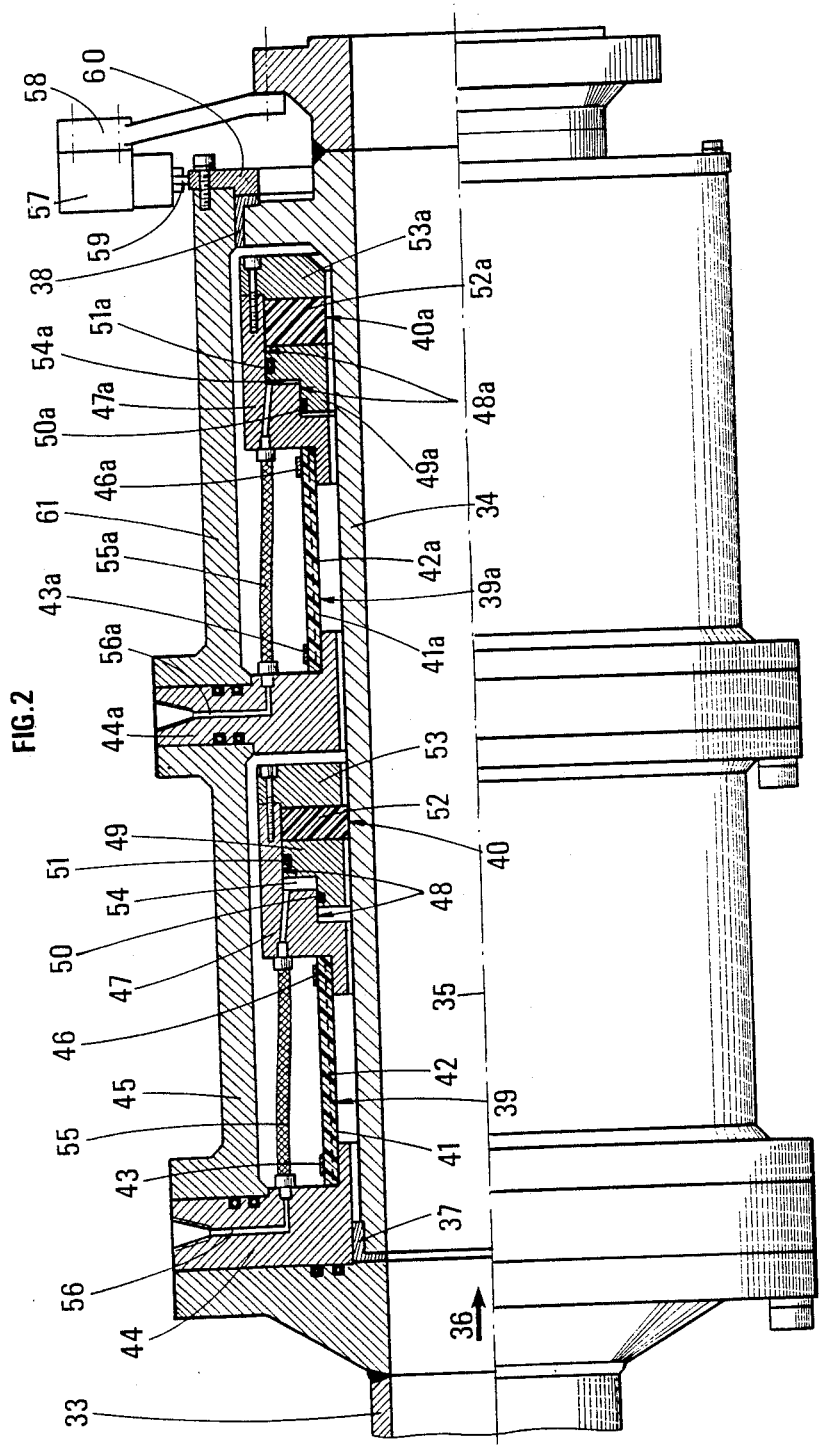
FIG. 2 is a longitudinal sectional view of a sealing system according to the invention, wherein the sleeve adapted to be subjected to elastic torsional deformation is a flexible tube, and wherein the temporary connection means includes a deformable ring.

FIG. 2 shows a second mode of implementation of the system for maintaining tightness, according to the invention, between two co-axial pipes 33 and 34 rotating in relation to each other around their common axis 35, the fluid under pressure which they transfer flowing from one to the other, for example, in the direction of arrow 36.

The two pipes 33, 34 are rotatably guided by bearings 37 and 38. The device includes two identical systems each including a sleeve 39 (or 39a) adapted to be subjected to elastic torsional deformation around the axis 35, and associated with a set of temporary connection means 40 (or 40a).

Each sleeve 39 (or 39a) includes a flexible pipe 41 (or 41a) made of elastically deformable material, to the best advantage reinforced by helically wound wire armour 42 (or 42a) which provides for a resistance to the pressure of the fluid conveyed from pipe 33 to pipe 34, which it temporarily confines as can be seen hereinafter. This flexible pipe 41 (or 41a) is fixed at one of its ends, for example, by means of a collar 43 (or 43a), to flange 44 which is integral with pipe 33 (or to flange 44a which is integral with pipe 33 through casing 45 and the flange 44). This flexible pipe 41 (or 41a) is fixed at its other end, for example, by means of a collar 46 (or 46a) to flange 47 (or 47a) supporting the set of temporary connection means 40 (or 40a).

This temporary connection means 40 (or 40a) includes, housed and sliding in a double bore 48 (or 48a) provided in flange 47 (or 47a), a staggered annular piston 49 (or 49a) equipped with seals 50 and 51 (or 50a and 51a) and an annular ring 52 (or 52a) made of elastically deformable material which is provided between this piston and an annular flange 53 (or 53a) blanking off the bore 48 (or 48a). The piston 49 (or 49a) defines with the flange 47 (47a) a variable geometry annular chamber 54 (or 54a) connected to the pressure fluid supply system described hereinafter, through the flexible pipe 55 (or 55a) and passage 56 (or 56a) provided in flange 44 (or 44a). As shown in FIG. 2, the two systems which include the sleeves 39 and 39a, and the temporary connection means 40 and 40a, which include the rings 52 and 52a, are provided around the pipe 34. The temporary connection means 40 are shown in a position where the ring 52, made of elastically deformable material, compressed between the flange 53 and the piston 49, the latter pushed by the pressure of the fluid admitted into the annular chamber 54, has changed shape and, behaving like an incompressible fluid, radially transmits the axial thrust it receives, and strongly surrounds the pipe 34. On the other hand, the connection means 40a is shown in the position where the pressure supply being stopped, the ring 52a has recovered, due to its elastic stiffness, to its initial shape by pushing back the piston 49a, and is no longer in contact with the pipe 34.

As is apparent from the following description, the device of FIG. 2 also includes a slide valve 57 which is rotatable with the pipe 34 through support 58. The slide valve 57 is actuated by the rollers 59 which follows the contour of the cam 30, rotatable with the pipe 33 through casings 61 and 45 and flanges 44 and 44a.

Figure 3:
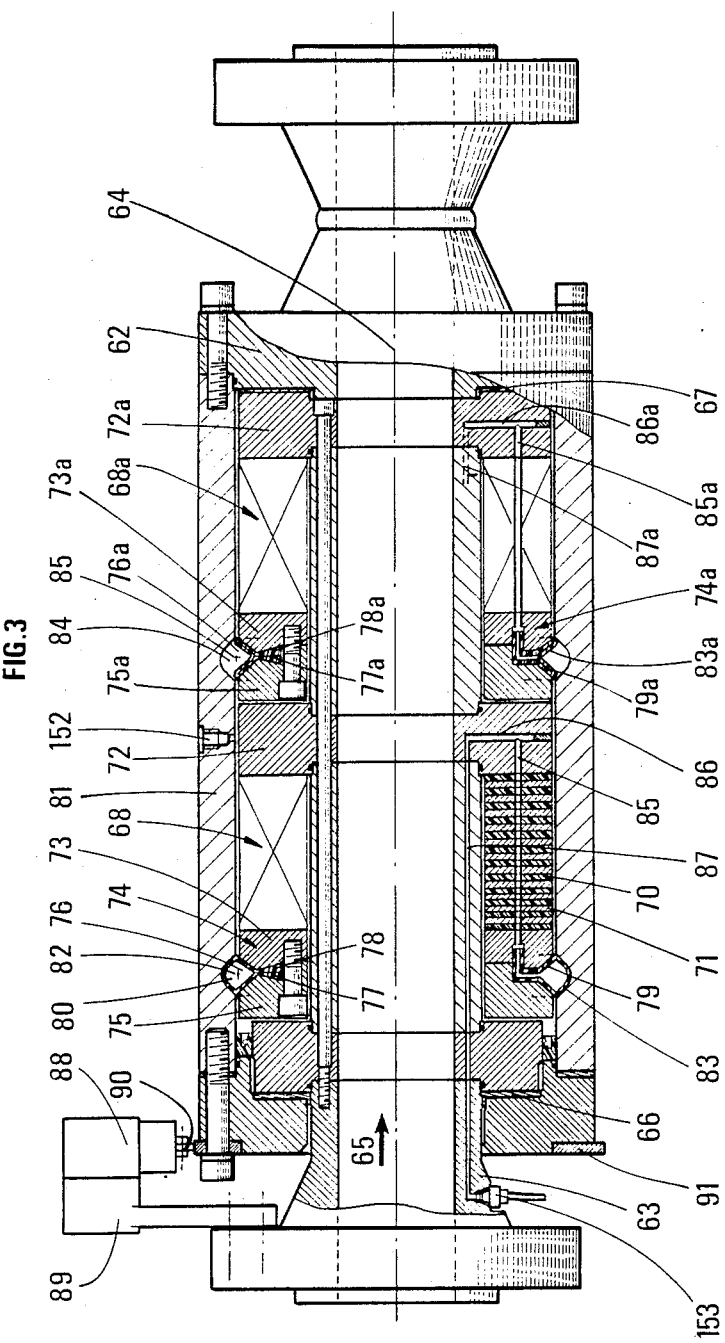
FIG. 3 is a longitudinal sectional view of a sealing system according to the invention wherein the sleeve adapted to be subjected to elastic deformation includes a plurality of flexible flat rings, and wherein the connection means includes an inflatable and contractable joint.

FIG. 3 provides an example of a device for maintaining tightness between two co-axial pipes 62 and 63, rotating relative to each other around their common axis 64, with the pressure fluid which they handle flowing, for example, in the direction of the arrow 65.

The two pipes 62, 63 are guided in rotation by bearings 66 and 67. The device includes two identical systems, each of which includes a sleeve 68 (or 68a) elastically deformable in torsion around the axis 64, associated to a set of temporary connection means 74 (or 74a). Each sleeve 68 (or 68a) including a stacking of flat rings 70 made of elastically deformable material, and rigid flat rings 71, each of the rigid flat rings being placed between two flat rings 70 made of elastically deformable material to which it adheres, for example, by sticking. The flat ring 70 made of elastically deformable material located at one of the ends of the sleeve 68 (or 68a) adheres to a flange 72 (or 72a) integral with the pipe 63, and the flat ring made of elastically deformable material located at the other end of this sleeve adheres to a flange 73 (or 73a) supporting the set of connection means 74 (or 74a). Each set of temporary connections means 74 (or 74a) includes as a companion a flange 75 (or 75a) which, by cooperating with the flange 73 (or 73a), defines an inner groove 76 (or 76a) and tightly presses the fastening rods 77 and 78 (or 77a and 78a) of the inflatable seal 79 (or 79a).

The inner groove 76 is associated with an outer groove 80 provided in the cylindrical casing 81 which prolongs co-axially the pipe 62 by surrounding the two temporary connection means 74 and 74a so as to create an annular housing 82 which totally encloses the mobile part 83 of the inflatable seal 79. In the same way, the inner groove 76a is associated with an outer groove 84, also provided in the casing 81, so as to create an annular housing 85 which totally encloses the mobile part 83a of the inflatable seal 79a. In FIG. 3, the seal 79 is shown in the position where the variable geometry inner chamber which it defines is supplied with pressure fluid through pipes 85, 86, 87 provided through the flange 73, through the stacking of flexible and rigid flat rings 70 and 71, through the flange 72 and through the wall of pipe 63 up to the union 153 connecting the pressure generation system described hereinunder. In this position, the mobile part 83 of seal 79 is expanded towards the outside and strongly pressed against the wall of groove 80. On the other hand, the seal 79a, whose inner chamber is also connected to the pressure generation system described hereinunder, namely through pipes 85a, 86a aand 87a, is shown in the position where, the pressure fluid supply being stopped, it is brought back, by its own elasticity, to its initial manufactured position, that is withdrawn. In this position, it is no longer in contact with the wall of groove 84.

As can be seen from FIG. 3, a slide valve 88 is rotatable with the pipe 63 through support 89. The slide of this valve is actuated by the roller 90 which follows the contour of cam 91 integral in rotation with the pipe 62 through the casing 81.

Any of the three types of torsionable sleeves as described can obviously be associated with any of the three connection means as described, without leaving departing from the scope of the invention.

Figure 4:
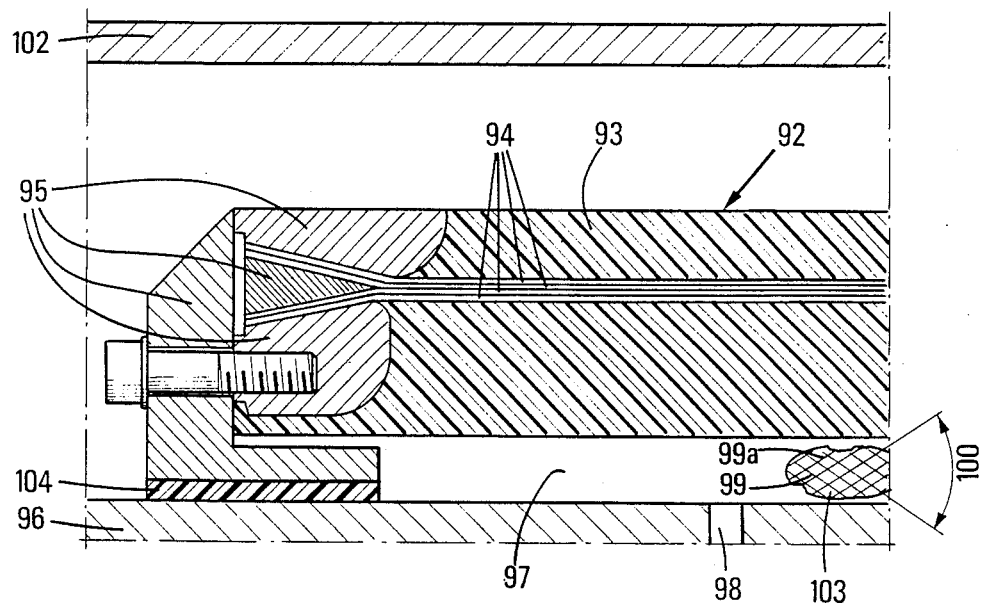
FIG. 4 is a longitudinal sectional view of an inflatable expandable seal, represented in its initial position without pressure.
Figure 5:
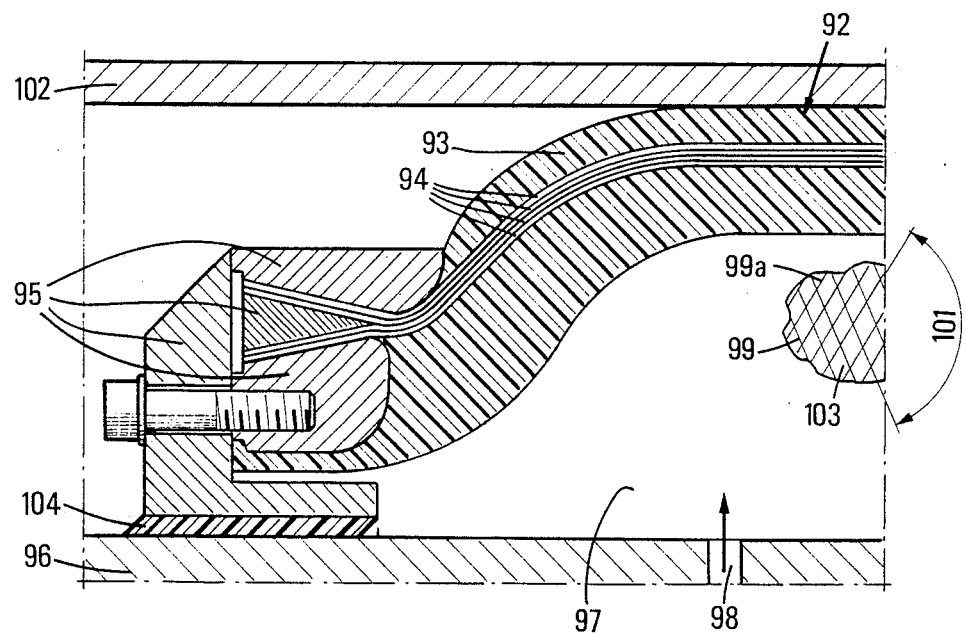
FIG. 5 is a longitudinal sectional view of the inflatable seal of FIG. 4 in an inflated and expanded position.

FIGS. 4 and 5 show an alternative of the inflatable seal system used, as shown in FIG. 3 as part of the temporary connection means. This inflatable seal 92 comprises an expandable torsionally deformable cylindrical sleeve 93 made of elastically deformable material, reinforced by a low tensile braided wire armour 94 securely fixed onto two end flanges such as 95. The flanges are connected to the end flange 96 of the inflatable sleeve 93, which was identified for example in FIG. 3 by number 68 or 68a, so that it defines with the seal 92 an annular chamber 97, which can be supplied with pressure fluid through port 98. The reinforcing armour 94 of sleeve 93 including two layers of helical wound wires or cables made of low tensile material 99 and 99a forming an angle 100, for example, close to 20°, such that, when the chamber 97 is fed with pressure fluid, these cables are tensioned and take a more stable orientation and thus form a new angle 101, for example close to 55°, which causes an increase in the diameter of the expandable sleeve 93, as shown on FIG. 5, where said sleeve is thus strongly pressed against the inner wall of casing 102.

On the other hand, as shown on FIG. 4, when the pressure fluid supply is stopped, each diamond shaped element made of elastically deformable material, such as 103, imprisoned between the cables, which was deformed due to the change of orientation of these cables, tends, by elastic return, to recover its original shape. The elastic return of all the elements 103 causes the elastic return of the whole sleeve 93, which has recovered its initial cylindrical shape, and has no longer contacts with the casing 102. It can be noted that the increase in diameter of the sleeve 93 under the pressure effect is generally accompanied by a decrease of its length.

This is why, in the example of implementation shown in FIGS. 4 and 5, the end flanges such as 95 of said sleeve 93 could be connected to flange 96 which supports them through ferrules, such as 104, made of elastically deformable material, to which they adhere and whose shear deformability in the axial direction tolerates this length decrease.

Furthermore, it would be possible, according to the invention, to make an inflatable seal which, instead of expanding under the effect of an internal pressurization and coming into contact with the inner wall of a casing which surrounds it, would universally have the property of shrinking under the effect of an external pressurization and would come into contact with the outer wall of a transfer pipe.

Figure 6:
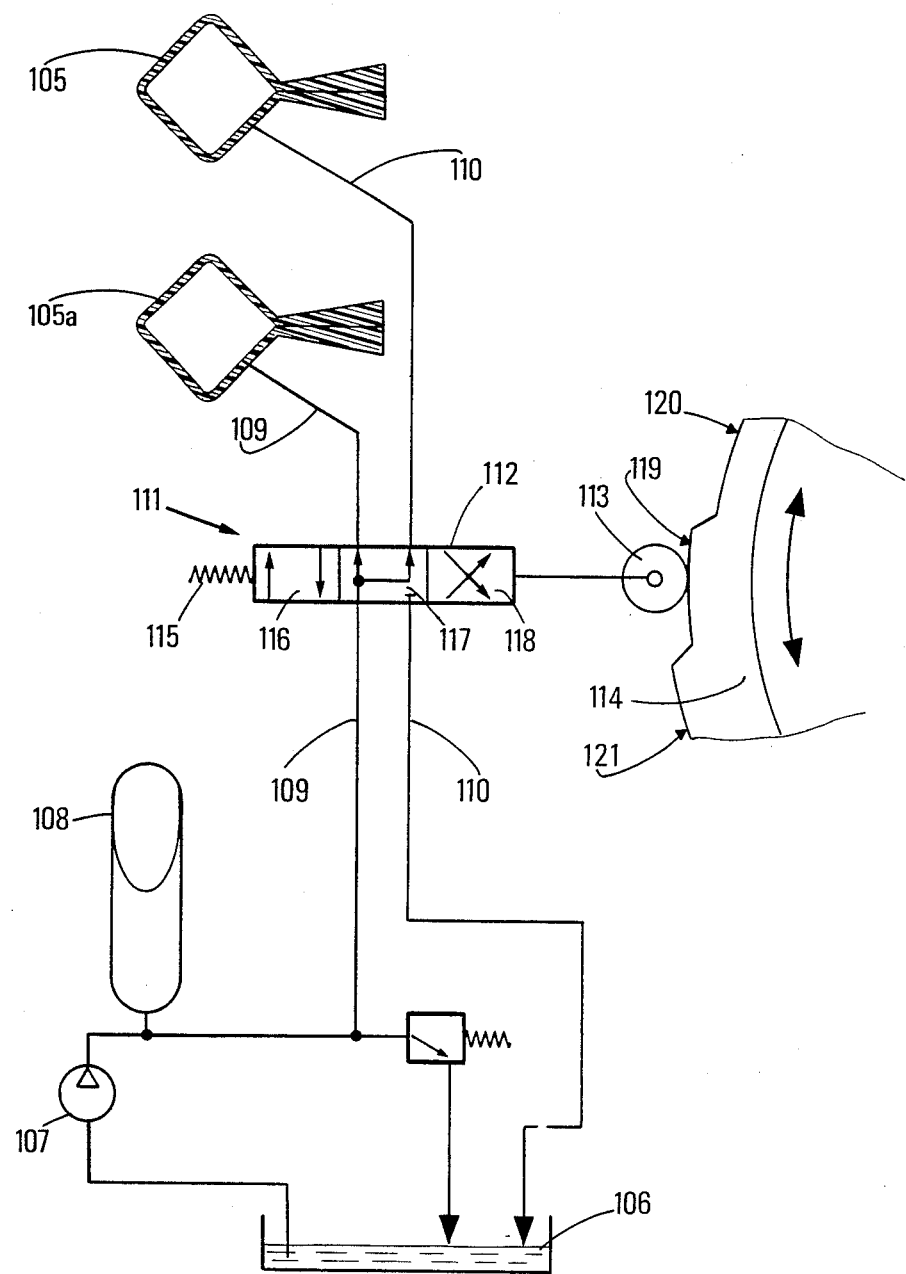
FIG. 6 is a schematic view representing in a simplified manner the connection means hydraulic drive system.

FIG. 6 shows, in a schematic and simplified manner, an example of implementation of the pressure fluid system feeding the connection means described hereinabove, wherein the two pipes receiving the pressure fluid, jacks. and inflatable seals, which actuate the connection means, are represented by two housings 105 and 105a.

In FIG. 6, the fluid is a hydraulic liquid which is withdrawn from a nonpressurized tank 106, and which, when pressurized by the pump 107, is stored in the oil and air accumulator 108. Two pipes 109 and 110 connect the two housings 105 and 105a to the pump 107 and the tank 106 through the hydraulic valve 111 provided with a slide 112 actuated by sensor 113 which follows the three level profile 119, 120 and 121 of the cam 114 with which it is maintained in contact by the thrust of spring 115. Slide 112 includes three sections 116, 117 and 118.

In FIG. 6, the slide is shown in its median position corresponding to the intermediate level 119 of the cam 114 profile, and in this position, both housings 105 and 105a are in communication with the pump 107 and fed with pressure fluid. One can easily imagine that, upon further rotation of the cam 114 relative to the slide valve 111, the sensor 113 will be brought into engagement with the level 120 of the cam profile closest to its rotation axis, whereby the slide 112 is displaced so that the inner ports of the section 116 communicate the housings 105, 105a through the pipes 109 and 110 with the non-pressurized tank 106.

In this position, the housing 105a is in communication with the pump 107 and pressurized, and the housing 105 is in communication with the atmospheric tank 106 and is depressurized. In the same manner, upon a further rotation of the cam 114 in the opposite direction relative to the slide valve 111, the sensor 113 will be brought into engagement with the level 121 of the cam profile furthest from its rotation axis, whereby the slide 112 is displaced in the opposite direction so that the inner ports of the section 116 communicate the pipes 109 and 110 with the non-pressurized tank 106. In this position, the housing 105 is in communication with the pump 107 and fed with pressure fluid, and the housing 105a is in communication with the atmospheric tank 106 and is depressurized.

The oil and air accumulator 108 is associated with the pump 107 so as to maintain pressure fluid feed for a certain time when, for any reason, the driving of said pump is stopped.

Figure 7:
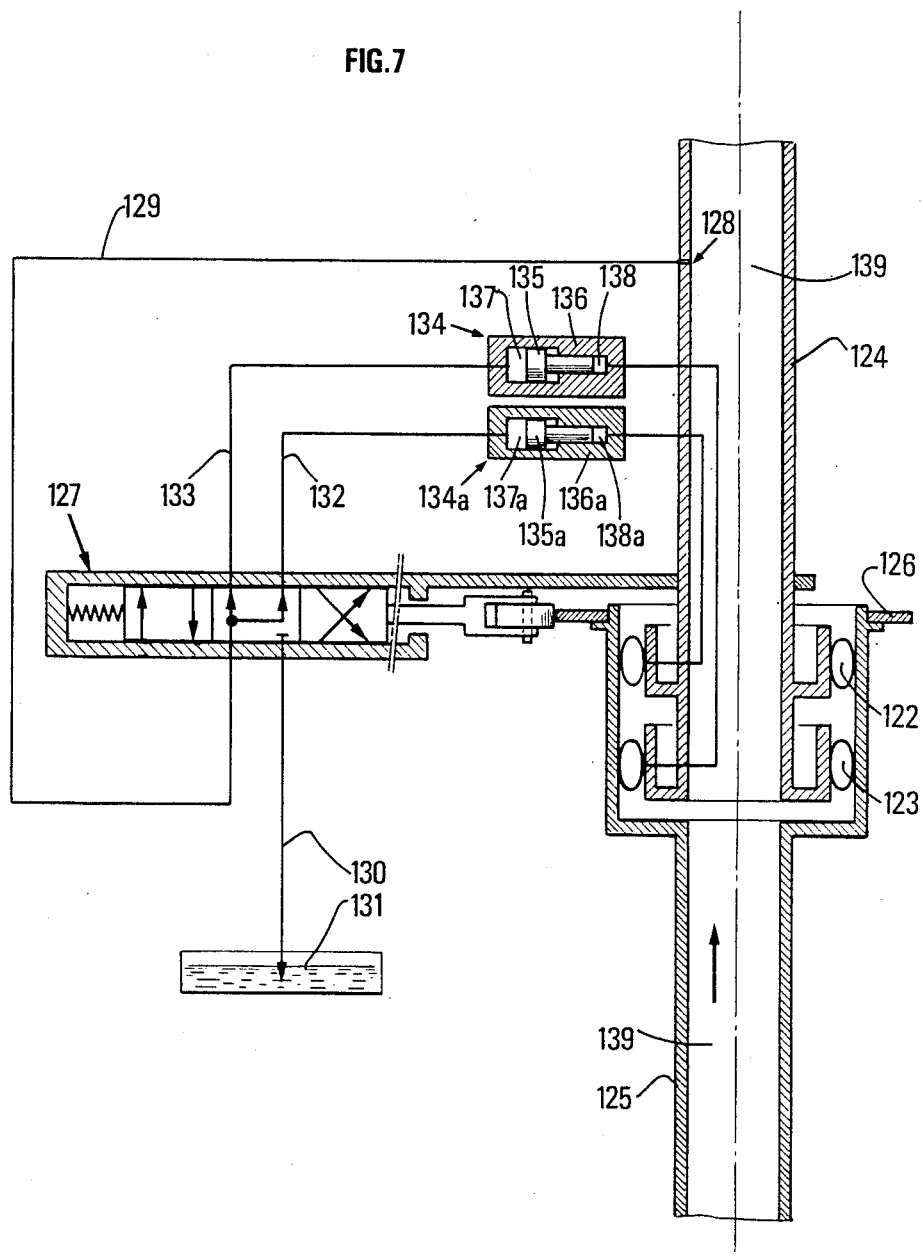
FIG. 7 is a schematic view of another embodiment of the connection means drive system of the present invention.

FIG. 7 shows, in a schematic and simplified way, an alternative of implementation of the connection means pressure fluid supply system, wherein the pressure fluid comes directly from pipe 139, which is to be confined, made up of two coaxial pipes 124 and 125 rotating relative to each other. The two pipes 124, 125 receiving this fluid, jacks and inflatable seals, which actuate these connection means, are represented by the two housings 122 and 123. The cam 126 is rotatably driven by the pipe 125 and the slide valve 127 by the pipe 124. The pressure fluid is drawn off pipe 124 through port 128. The pipe 129 connects this port to slide valve 127, the pipe 130 connects the slide valve to the non-pressurized tank 127. The pipes 132 and 133 connect the slide valve 127 to the two housings 122 and 123 respectively through two pressure boosters 134 and 134a.

Each pressure booster 134 or 134a includes a staggered piston 135 (or 135a) sliding in a tight body 136 (or 136a) provided with two co-axial bores 137 and 138 (or 137a and 138a) of different cross sections, so that the outlet pressure, on the side of the smaller diameter bore 138 (or 138a), is higher than the inlet pressure, on the side of the larger diameter bore 137 (or 137a), hence higher than the pressure in the system 139.

This supply system operates in the same way as the system described hereinabove in connection with FIG. 6, only the source of the pressure fluid is different with this alternative, the pressure fluid which came from the FIG. 6 system of the pump 107, comes directly from the pipe 139.

FIG. 8 shows a fixing mode for the slide valve 140 which, as in the examples of implementation described above, is associated with a cam 141, whose staggered profile includes three levels 1421, 143 and 144. Each of these three position of the slide valve corresponds to one of the cam levels. The slide valve 40 slides on a ring 145 integral in rotation with one of the fluid transfer pipes (not shown) with axis 146, rotating around this axis in relation to the other pipe 147 with same axis which bears the cam 141. For example, the valve 140 may slide on the ring 145 through guiding yokes 148 and 149, yoke 149 bearing the lock screws 150 and 150a.

As can be seen from the description hereinbelow, it may be of interest to be able to set, in this manner, the initial position of the slide valve 140 relative to profile of cam 141, especially when the rotation of the two fluid transfer pipes relative to each other around the axis 146 is limited to an angular motion of an angle smaller than the angle 151, corresponding to the perimeter of only one level of the cam such as for example 142 or 144.

The operation of the device thus described is easy to understand. For description purposes, this operation will be referred to the modes of implementation described on FIGS. 3 and 6, and then, as can be seen, the operation will be similar to the embodiments described in connection with FIGS. 1, 2, 4, 5 and 7.

During the rotation, relative to each other around axis 64, of the two fluid transfer pipes 62 and 63, tightness between these two pipes is maintained according to a multiple of three consecutive operating sequences, corresponding to three configurations of the device.

As shown in FIG. 6, the first sequence corresponds to a device configuration where the roller feeler 113 (90 on FIG. 3) moves along level 120 of cam 114 (91 in FIG. 3). The slide 112 of the valve is then in an extreme position, the spring 115 being released, where the inflatable seal 105 (79 in FIG. 3) is in communication with the atmospheric tank 106, and where the inflatable seal 105a (79a in FIG. 3) is in communication with the pressure fluid supply, for instance with pump 107.

FIG. 3 shows that, as a result, the depressurized seal 79 has no contact with the casing 81 integral with pipe 62, and that the flange 74 which supports the seal 79 can rotate freely with the pipe 63. On the other hand, the pressurized seal 79a is strongly applied onto the casing 81, so that it ensures tightness between this casing and the flange 74a which supports it and the rotational driving of this flange through the casing 81. The elastic sleeve 68a, whose ends are fixed on two flanges 72a and 74a which, driven by the pipes 62 and 63, rotate relative to each other, undergoes a torsional deformation which is necessarily limited angularly, for instance at 20° on both directions of rotation.

When the torsional deformation of sleeve 68a approaches the allowable limit, i.e., for instance after an 18° torsion, the roller sensor 113 reaches the level 119 of the cam 114 on which it then moves during for instance a 2° rotation. During this second operating sequence, the slide of the valve 111 is in a median position, and the two inflatable seals 105 and 105a (79 and 79a in FIG. 3) are pressurized simultaneously.

Tightness is ensured at the level of both the inflatable seal 79 and the inflatable seal 79a, and the fluid trapped between these two seals can be drained through the port 152, towards a leak recovery system (not shown).

The flange 75 which supports the seal 79, is driven into partial rotation through the casing 81 integral with the pipe 62, and the elastic sleeve 68 undergoes partial torsion, for instance, of 2°, whereas, the torsion of sleeve 68a reaches the maximum allowable angle considering the shear flexibility of elastomeric flat rings, such as 70, which make it up.

At that time, the roller sensor 113 reaches the level 121 of the cam 114 along which it moves during a rotation of for instance 18°. During this third operating sequence, the slide of valve 111 is in an extreme position, opposite to the position which it occupied during the first sequence, and in which the spring 115 is compressed.

In this configuration, the inflatable seal 105 (79 in FIG. 3) is still in communication with the pressure fluid supply, for example with pump 107. On the other hand, the inflatable seal 105a is put in communication with the atmospheric tank 106. As a result, the seal 105a (79 on FIG. 3) is depressurized and is no longer in contact with the casing 81 integral with the pipe 62. Owing to the elastic return of its elstomeric components, such as 70, the torsionally elastic sleeve 68a comes back to its initial position and is thus ready to take up the first sequence again. The three sequences described hereinabove may be repeated as many times as necessary to allow the rotation of pipes 62 and 63 in relation to one another, by maintaining tightness by a step-by-step operation of the device, confinement being interrupted only by one of the two similar components operating alternately, for instance 68, only when it is ensured by the other, for instance 68a.

It is easy enough to understand that the operation is similar if the inflatable seals are of the type of seal 92 shown on FIGS. 4 and 5.

Also, the operation is similar when the torsionally elastic sleeves are of the same type as the sleeves 17 and 17a of FIG. 1 or 39 and 39a of FIG. 2, and when the temporary tight connection is achieved in the same manner as that shown on FIG. 1 through the set of means 16 and 16a, or FIG. 2 through the elastic rings 40 and 40a.

The operation is also similar, if as in FIG. 7, the pressure fluid supply comes directly from the pipe 139 of the fluid to be confined, the pressure boosters 134 and 134a added to the system being only used to increase the pressure level of the inflatable seals to a value exceeding the pressure level in the pipe 139, to allow them to insure tightness. However, in that case, it is necessary to explain that the pistons 135 and 135a of these boosters can take two positions depending on whether the pipe 133 or 132 which connects them to slide valve 127 is in communication with the source of pressure fluid through pipe 129, or with atmospheric tank 131 through pipe 130. In the first case, the piston 135 (or 135a) under the effect of the fluid pressure exerted in bore 137 (or 137a) is pushed towards bore 138 (or 138a) whose content is pushed towards the temporary connection means actuator 122 (or 123). In this second case, the actuator 122 (or 123), by its own elastic return, return the fluid it contains towards the bore 138 (or 138a) to push the piston 135 (or 135a) towards the bore 137 (or 137a) whose vented content is pushed towards the tank 131.

The advantages of this invention mainly result from the possibility offered by the use of this device, to substitute means limited to the tightness between two fixed surfaces relative to each other for the means intended to obtain tightness between two surfaces rotating in relation to each other. Now, one knows that in the current state of the art, tightness between fixed surfaces is easily obtained for high pressures, even if the fluid is a gas.

On the other hand, the pressure level being reached, the reliability and life are limited if tightness is to be obtained between surfaces rotating in relation to each other, and above all if the rotation motions are alternating, and hence include many reversals of the direction of rotation.

The sealing system or device according to the invention can be used on all systems including high pressure pipes rotating slowly in relation to each other, and most motions of which are alternating oscillations of small amplitude, whereas rotations exceeding one turn are occasional. It is particularly suitable for swivel joints used in the development of subsea oil fields, for the transfer of production which may be oil or gas, between a marine structure with a fixed position relative to the sea bed and a floating structure which may be a processing vessel or a storage vessel and which under the action of wind, current and swell, weathervane about the marine structure.

I claim:

1. A system for maintaining tightness between two parts rotatable relative to each other, the system comprising at least two deformable sealing means, each of said sealing means having at least two possible states, a first state for insuring tightness between said two parts, and a second state wherein tightness is not insured, and wherein drive means are provided for intermittently actuating each of said sealing means in response to rotation of said two parts.

2. The system for maintaining tightness according to claim 1, wherein each of the two parts includes a pressure fluid transfer pipe rotatable relative to a common axis.

3. The system for maintaining tightness according to claim 2, wherein at least one of said sealing means comprises a sleeve adapted to be subjected to elastic torsional deformation along an axis thereof, said sleeve being tightly connected at one end thereof to one of the pressure fluid transfer pipes and including at an opposite end thereof and end flange provided with temporary connection means for enabling a connection to the other pressure fluid transfer pipe.

4. The system for maintaining tightness according to claim 3, wherein the sleeve adapted to be subjected to elastic torsional deformation comprises a stack of flat elastically deformable rings and rigid flat rings, each of said rigid flat rings being placed between and adhering to two flat elastically deformable rings, the flat elastically deformable ring located at one of the ends of said sleeve adhering to an end flange integral with one of the two pressure fluid transfer pipes and the flat elastically deformable ring located at the other end of said sleeve adhering to the end flange provided with temporary connection means to the other pressure fluid transfer pipe.

5. The system for maintaining tightness according to claim 3, wherein the temporary connection means comprises a tight and elastic membrane integral with the end flange of the sleeve adapted to be subject to elastic torsional deformation with which it defines a variable geometrical annular chamber concentric with one of the pressure fluid transfer pipes, said elastic membrane being adapted to, depending upon whether said annular chamber which it defines is fed with pressure fluid or not, a first inflated position in which the membrane is strongly applied against said one pressure fluid transfer pipe thus insuring tightness between said sleeve and said one pressure fluid transfer pipe, and the rotational driving by friction, of said end flange of said sleeve by the pressure fluid transfer pipe, and a second deflated position in which the elastic membrane is returned by its own elastic stiffness against the end flange in its initial rest position, and is no longer in contact with the pressure fluid transfer pipe.

6. The system for maintaining tightness according to one of claim 1, 2, 3, or 5, wherein the drive means includes a cam means integral with one of the two pressure fluid transfer pipes, and a position detector means associated with said cam means and fixed to the other pressure feed transfer pipe, said position detector means initiating an operation of the temporary connection means associated with the sealing means.

7. The system for maintaining tightness according to claim 6, wherein the position detector means includes a three position valve means having a slide member and a sensor means, said cam means having a three level contour engageable by said sensor means, a first and second pipe connecting respectively communicating with the temporary connection means associated with the sealing means, a third pipe communicating with a pressure fluid generator associated with a pressure accumulator, and a fourth pipe communicating with a receiver tank vented to the atmosphere from which the pressure fluid generator draws the fluid which it pressurizes, and wherein said valve means controls the communication between said pipes such that the three positions of said slide member of said slide valve means corresponds to actuating sequences of said sealing means during which successively only one of the two sealing means is actuated, then both sealing means, then only the second sealing means, with each of these sequences respectively corresponding to one of said levels of said cam means.

8. The system for maintaining tightness according to claim 7, wherein to insure pressure fluid feed to said temporary connection means, a pipe connects said slide valve means to the system comprising the two coaxial fluid transfer pipes so as to directly use energy of the fluid to be confined to operate said connection means.

9. The system for maintaining tightness according to claim 8, wherein at least a pressure booster comprising a staggered piston sliding in a tight body with two coaxial bores is interposed in a pressure fluid supply system of said temporary connection means.

10. The system for maintaining tightness according to claim 7, wherein the position detector means is connected to the pressure fluid transfer pipe not integral with said cam means by fastening means indexable in azimuth suitable for setting an initial position of said position detector means relative to a contour of the cam means.

11. A method for using a system for maintaining tightness between two parts rotatable relative to each other, which system comprises at least two deformable sealing means each having at least two possible states, a first state for insuring tightness between said two parts, and a second state wherein tightness is not insured, and a drive means for actuating each of the sealing means, the method comprising the steps of intermittently actuating each of said sealing means in response to rotation of said two parts, and permanently maintaining at least one of the sealing means in the first state.

* * * * *